United States Patent [19]

Woodham, Jr. et al.

[11] Patent Number: 6,069,668
[45] Date of Patent: May 30, 2000

[54] SYSTEM AND METHOD FOR PRODUCING VIDEO EFFECTS ON LIVE-ACTION VIDEO

[75] Inventors: David J. Woodham, Jr., San Mateo, Calif.; William C. Woodbury; Daniel Dresdner, both of Gainesville, Fla.

[73] Assignee: Pinnacle Systems, Inc., Mountain View, Calif.

[21] Appl. No.: 08/833,503

[22] Filed: Apr. 7, 1997

[51] Int. Cl.[7] .................................................. H04N 9/74
[52] U.S. Cl. ........................ 348/578; 348/580; 348/583; 348/590
[58] Field of Search ................................... 348/578, 580, 348/583, 584, 585, 586, 587, 590, 239; 382/276, 277, 293, 285, 296, 298; H04N 9/74

[56] References Cited

U.S. PATENT DOCUMENTS

| | | | |
|---|---|---|---|
| 4,472,732 | 9/1984 | Bennett et al. | 358/22 |
| 4,860,217 | 8/1989 | Sasaki et al. | 364/518 |
| 4,956,872 | 9/1990 | Kimura | 382/44 |
| 5,204,944 | 4/1993 | Wolberg et al. | 395/127 |
| 5,233,332 | 8/1993 | Watanabe et al. | 340/724 |
| 5,412,401 | 5/1995 | Wolf et al. | 345/139 |
| 5,412,479 | 5/1995 | Alig et al. | 348/594 |

OTHER PUBLICATIONS

George Wolberg, "*Digital Image Warping*", published by the IEEE Computer Society Press, 1990, §7.5, pp. 222–240.

*Primary Examiner*—Sherrie Hsia
*Attorney, Agent, or Firm*—Thomas Schneck; George B.F. Yee

[57] ABSTRACT

A digital video effects system for producing live-action video effects in real time includes an address generator having a pair of 2-D tables for providing x-coordinate and y-coordinate offset values. A third 2-D table contains warp activation factors (activators) which are scaled by a clip and gain processing technique to produce scaled activators. The scaled activators are used to scale the x- and y-offset values which are then combined with the original raster-order addresses to produce frame buffer readout addresses. An output video signal is produced by an inverse mapping of the input frame buffer to the output. The 2-D tables provide control of the image on a pixel-by-pixel basis. The degree of scaling by the clip and gain unit varies with time so that the resulting readout addresses also vary with time. A video effect, therefore, is produced simply by adjusting the scaling of the clip and gain unit. Moreover, a variety of effects can be achieved simply by changing the various 2-D tables.

62 Claims, 9 Drawing Sheets

Bounded Continuous

FIG. 6B

Piecewise Linear

FIG. 6C

Piecewise Continuous

FIG. 6D

Piecewise Linear/Continuous

FIG. 6E

Discontinuities

| TIME PERIOD | RASTER ADDRESS | READOUT ADDRESS |
|---|---|---|
| $t_1-t_3$: | $(X_1, Y_1), (X_2, Y_3)$ | $(X_1, Y_1), (X_2, Y_3)$ |
| | $(X_1, Y_3), (X_2, Y_2)$ | $(X_1, Y_3), (X_2, Y_2)$ |
| $t_4$: | $(X_1, Y_1), (X_2, Y_3)$ | $(X_1, Y_1), (X_2, Y_3)$ |
| | $(X_1, Y_3), (X_2, Y_2)$ | $(X_1+S_4 \times 10, Y_3+S_4 \times 5), (X_2+S_4 \times 10, Y_2+S_4 \times 5)$ |
| $t_5$: | $(X_1, Y_1), (X_2, Y_3)$ | $(X_1, Y_1), (X_2, Y_3)$ |
| | $(X_1, Y_3), (X_2, Y_2)$ | $(X_1+S_5 \times 10, Y_3+S_5 \times 5), (X_2+S_5 \times 10, Y_2+S_5 \times 5)$ |
| $t_6$: | $(X_1, Y_1), (X_2, Y_3)$ | $(X_1, Y_1), (X_2, Y_3)$ |
| | $(X_1, Y_3), (X_2, Y_2)$ | $(X_1+S_{max} \times 10, Y_3+S_{max} \times 5), (X_2+S_{max} \times 10, Y_2+S_{max} \times 5)$ |
| $t_7$: | $(X_1, Y_1), (X_2, Y_3)$ | $(X_1+S_7 \times 10, Y_1), (X_2, Y_3)$ |
| | $(X_1, Y_3), (X_2, Y_2)$ | $(X_1+S_{max} \times 10, Y_3+S_7 \times 5), (X_2+S_{max} \times 10, Y_2+S_{max} \times 5)$ |
| $t_8$: | $(X_1, Y_1), (X_2, Y_3)$ | $(X_1+S_8 \times 10, Y_1+S_8 \times 5), (X_2, Y_3)$ |
| | $(X_1, Y_3), (X_2, Y_2)$ | $(X_1+S_{max} \times 10, Y_3+S_8 \times 5), (X_2+S_{max} \times 10, Y_2+S_{max} \times 5)$ |
| $t_9-t_{10}$: | $(X_1, Y_1), (X_2, Y_3)$ | $(X_1+S_{max} \times 10, Y_1+S_{max} \times 5), (X_2, Y_3)$ |
| | $(X_1, Y_3), (X_2, Y_2)$ | $(X_1+S_{max} \times 10, Y_3+S_{max} \times 5), (X_2+S_{max} \times 10, Y_2+S_{max} \times 5)$ |

SYSTEM AND METHOD FOR PRODUCING VIDEO EFFECTS ON LIVE-ACTION VIDEO

TECHNICAL FIELD

The present invention relates generally to the field of computer image processing and more specifically to a system and method for producing video effects on live-action video in real time.

BACKGROUND ART

Broadcasters and professionals who produce video material use digital video effects (DVE) generators to enhance the capabilities of their video productions to catch a viewer's attention, to communicate, to entertain, and to instruct. A typical DVE inputs a foreground video signal and a background video signal. It geometrically transforms the foreground signal and then layers the transformed video over the background signal to produce a video output. These effects switch from one video signal (source) to a second video signal (source) over a short time period, typically from one-half second to two seconds. Perhaps the simplest transition effect is to slide the first video source off the screen, revealing the second video source behind it. Those who make video programs have for years desired an inexpensive DVE, which they can easily use to quickly produce any imaginable transition effect, running in real time with live-action video. Presently, however, the typical DVE is expensive, and only capable of a small, limited set of video effects.

Particle explosion effects are one class of desirable transition effects. A first video source appears to fragment into many small pieces which fly away along independent trajectories. The effect reveals the second video source, which remains stationary in the background, as particles of the first video fly away and off the screen. Preferably, in the most general case, a DVE should permit one to control the effect in such a way that individual particles can be set into motion at different times on different parts of the screen. Such control permits a wide range of explosion effects, including explosions centered anywhere on the screen, or dispersement of particles giving the illusion that a gust of wind suddenly kicked up blowing away particles of video.

Burst effects are another highly desirable transition effect. In one type of burst effect, the first video source remains stationary while video 'rays' of the second video source burst outward from a central point and fill up the screen to totally cover the first video source. These effects are more visually pleasing when the 'rays' can fly out at different times in a staggered fashion. A second type of burst effect removes the first video source by splitting it into rays of video that burst outward and off the screen. This process uncovers the second video, which remains stationary in the background. Again it is highly desirable in this kind of effect that the busts of rays fly away at different times in a staggered fashion.

Texture effects, painterly effects, and refraction effects are highly desirable non-transition effects. Rather than producing a transition from one video source to a second, these effects change the appearance of a single video source. Texture effects should give a video source the look of being painted onto a textured surface, such as a brick wall, a plastered wall, woven fabric, a tiled floor, etc. Painterly effects give video the look of being painted or drawn by an artist. Refraction effects give a video source the appearance of being viewed through a transparent surface, such as water droplets on a mirror, a rippling water surface, soap bubbles, beveled glass tiles, and so forth.

Presently, typical DVE's are capable of only limited numbers of such effects. For example, particle explosion effect DVE's use high end, polygon-based architectures to produce their effects. Polygon processing is a computationally expensive task, and so requires expensive hardware to implement.

Texture effects, painterly effects, and refraction effects for live video generally are less sophisticated. One method for producing texture effects uses partial dissolves between video and a still image of a desired texture. Another technique uses 3-D lighting models to produce highlights on video, giving the effect that the video was mapped onto a textured surface. Painterly effects can be produced by a technique called posterization, wherein color information is removed, thereby using only a fraction of the total colors available. Another technique called mosaic tiling sets pixels within a rectangular block to have the same color during one frame of video.

Burst effects processing is typically performed with warp-based DVE's. A warp-based DVE produces transition effects with warp tables to generate curved effects such as wavy shapes, page turn effects, and cylinder effects. Before describing how traditional warp hardware operates, a brief overview of the processing which occurs in a typical DVE to produce video effects will be presented.

Figure 10:
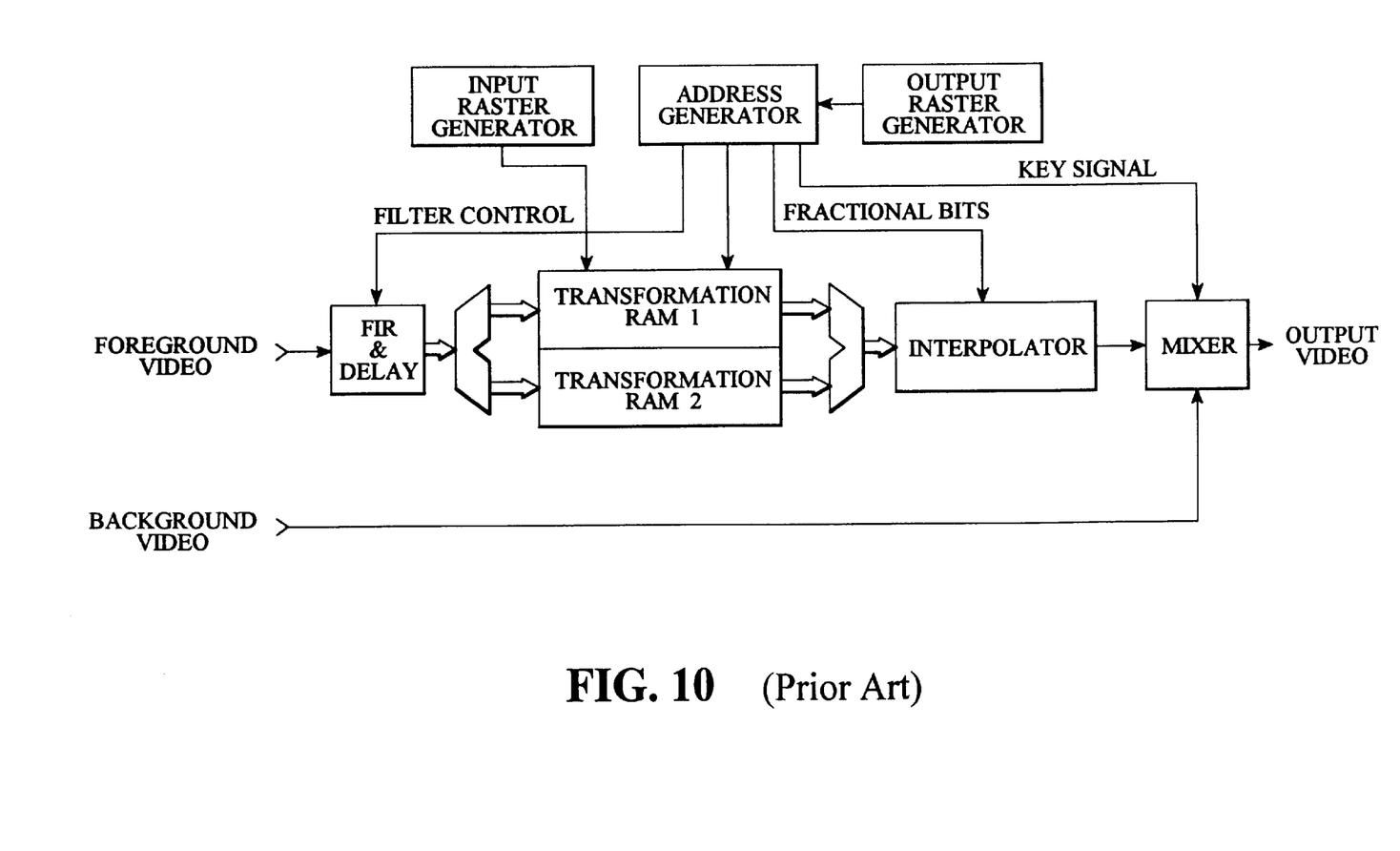
FIG. 10 shows a block diagram of a conventional video effects device.

Referring to the block diagram of FIG. 10, a DVE receives a foreground video signal. For an NTSC formatted signal, the video signal consists of a sequence of frames, with 525 scan lines per frame, at thirty frames per second. In addition, each frame is composed of two interlaced fields of 262.5 scan lines per field. The even-numbered scan lines (commonly referred to as the first field of the video frame) are sampled, typically at 720 samples (or pixels) per scan line, and stored in a first static transformation RAM, while the odd-numbered scan lines (commonly referred to as the second field of the video frame) are stored in a second static transformation RAM. This allows processing of a video frame in pipeline fashion; while one field is being read in, the other field is read out. Other video standards include SECAM (sequential chrominance signal with memory) and PAL (phase alternating line). These systems use 625 lines per frame at 25 frames per second.

A finite impulse response (FIR) filter and interpolator serve to maintain video picture quality during resampling. The FIR filter is a low pass filter controlled by the address generator to block frequency components in the input video which are greater than one-half the resampling frequency of the address generator, vis-a-vis the Nyquist criterion. The interpolator uses fractional bits produced by the address generator, permitting the discrete nature of the transformation RAM to be treated as a continuous field of input pixel values.

There are two methods of transforming an input image: forward mapping and inverse mapping. Output images produced by inverse mapping are generally of higher quality than images produced by forward mapping for comparably configured systems. Thus, most all DVE's use inverse mapping. Referring to FIG. 10, the address generator produces addresses to read out the transformation RAM by transforming a sequence of raster-order addresses to produce a new sequence of addresses. The new sequence of addresses (readout addresses) is then used to read out the transformation RAM, a process known as image resampling. Finally, the generated output is mixed with the background video in accordance with a key signal, also produced by the address generator. It is noted that a large measure of the final video effect is due to the sequence of readout addresses generated.

A warp-driven DVE utilizes warp tables to produce readout addresses to create a desired effect in the output image by specifying, in one or more lookup tables, a geometric transformation of the input. Warp tables are typically used for generating various effects, such as page turn, meltdowns, burst, circular waves (splash effect), and swirls. For example in U.S. Pat. No. 5,233,332 to Watanabe et al., a system for generating page turn effects includes a read address generator (14, FIGS. 3 and 8) that employs lookup tables which are addressed (indexed) by a measure of the distance between a point and a line. The outputs of the lookup tables are then used to offset output coordinates to produce readout addresses (inverse mapping).

Most warp-based DVE's operate in this or a similar mode; the differences being how the warp table addresses are computed and how the output of the warp table is used to produce a read-out address. For example, a meltdown effect involves addressing a warp table by computing the distance to a line to retrieve a scaling factor, and scaling a pixel-to-line vector which is then used to offset output coordinates. A burst effect is produced by obtaining scale factors from a warp table based on computed angles around a point and scaling a pixel-to-point vector to offset output coordinates. Circular waves require a distance-to-a-point measurement to address the warp table, and scaling of a pixel-to-point vector. Swirls are produced by indexing the warp table with distance-to-point measurements, and rotating output coordinates around a point based on the output of the warp table.

Video effects using warp table architectures are cost effective as compared to polygon-based 3D systems. It is therefore desirable to provide a warp-driven system which is capable of producing a variety of video effects, including effects not currently available in existing warp-driven systems and effects which are not possible in today's warp-based DVE's. It is also desirable to have a DVE which can provide a full suite of video effects in a cost effective system, and which can produce such effects on live-action video in real time. It is also desirable to provide a DVE which can be easily and readily configured to produce different video effects on live-action video.

SUMMARY OF THE INVENTION

A digital video effects system of the present invention includes means for capturing a frame of live-action video. A means for producing addresses feeds into an offset table to produce an offset vector. The addresses also feed into a warp activation table to produce a raw activation factor (activator). The addresses are generated first by producing raster-order addresses. This is simply a set of x-y spatial coordinates in scanline order. Next, the addresses are transformed through a 3-D and perspective transformer. The 3-D transformation produces effects including scaling, rotation, translation, and shear.

The offset and warp tables are 2-D tables addressed (indexed) by row and column. The offset tables consist of a table of x-offset values and a table of y-offset values, which together specify offset or displacement vectors in rectangular coordinate notation. Alternatively, the offset vectors may consist of tables containing angle and magnitude values, i.e. polar coordinates. The 2-D arrangement of the offset table entries coincides with pixel positions, allowing each pixel position to be individually controlled.

An adjustment means provides a mapping relation which maps raw activators to scaled activators. The scaled activators, in turn, scale the outputs of the x-offset and y-offset tables to produce scaled offset vectors. The scaled offset vectors may be further scaled by user specified scale factors. The scaled offset vectors are then used to perform an inverse mapping of the input pixels to produce the desired video effect.

In addition, a 2-D key table is provided, the output of which is coupled to its own adjustment means. The key table provides a key signal which is used to blend together the foreground and background video images.

In one embodiment of the invention, the adjustment means consists of a straight line function which computes the scaled activator as a function of raw activators falling within a range defined by a minimum and a maximum threshold. Where the raw activator falls outside of the range, the computed scaled activator is set to either a first value or a second value.

In a variation of the present invention, the adjustment means can be a continuous mapping function defining the scaled activator as a function F of the raw activator, such that:

$$S = \begin{cases} S_{\min} & \text{for } R \leq (R_{\min} + \Delta R) \\ F(R - (R_{\min} + \Delta R)) & \text{for } (R_{\min} + \Delta R) < R < (R_{\max} + \Delta R) \\ S_{\max} & \text{for } R \geq (R_{\max} + \Delta R) \end{cases}$$

where:

S is the scaled activation factor,

R is the raw activation factor, $R_{min}$ and $R_{max}$ are minimum and maximum thresholds, and $\Delta R$ is a shift amount.

The adjustment means is varied by incrementing or decrementing $\Delta R$. In fact, $R_{min}$ and/or $R_{max}$ may vary over time independently as well, where $R_{min} \leq R_{max}$. In yet another variation, the function F can be any arbitrary combination of piecewise linear and/or piecewise continuous functions and may include discontinuities between segments. This type of processing is herein referred to variously as clip-and-gain processing or threshold activated processing.

The adjustment means varies over time, and in a preferred embodiment the variation occurs with each field of a frame of live-action video. The adjustment means is varied by changing the minimum and maximum thresholds with each new field. In the case where the mapping function is a straight-line function, its slope (gain) can be made to vary by changing the minimum and maximum thresholds at different rates. The use of 2-D tables and threshold activated processing offers the unique capability of controlling when particular parts of the processed image begin warping, how fast each part warps, and the warp behavior of each part as the effect runs.

As will now be explained, the DVE of the present invention offers many advantages over existing systems. For example, particle explosion effects can be easily produced at much lower cost. Simply by loading different warp tables, particles of arbitrary shape can be defined along with the order in which the particles begin to move. By loading different offset tables, individual trajectories of the particles can specified. Adjusting the gain of the clip-and-gain function varies the time-staggering of the particle motion; i.e. when each particle or group of particles begins its movement.

The ability to individually specify the mapping of each pixel, made possible through the use of the 2-D offset tables, permits burst effects not available in existing warp-based DVE's. For example, any shape burst is possible, such as rays, pointed stars, radial wavy effects, and flower-like shapes. Bursts can pop outward from a central point to fill the screen. Burst rays can pop out in a time-staggered fashion, or star points can pulsate and change shape as they expand outward. Burst rays can follow spiraling trajectories, as well as straight out from the center trajectories. Multiple little bursts can explode, in time-staggered fashion if desired, to fill the screen.

While high-end DVE's using expensive 3-D graphics hardware can be used to produce certain texture, painterly, and refraction effects on live-action video, such systems are cost prohibitive. However, simply by loading appropriate warp, offset, and key tables into the DVE of the present invention, such effects for real time live-action video effects are easily and inexpensively realized. Texture effects include mapping of live video onto a variety of surfaces such as woven fabric, rough paper, brick wall, plaster wall, corrugated steel, etc. Texture effects can easily transition smoothly in real time from untextured to fully textured. Texture effects can be made to pan through the video, zoom in and out the detail of the texture, or stretch the texture in any 2-D direction. Painterly effects can make video look like a hand drawn or painted animation, a composition of brush strokes, or a composition of tiles. Video can be smoothly transitioned in real time from an unwarped image to a tiled image. In addition, size, shape and orientation of tiles or brush strokes can be varied in real time. Refraction effects can produce the appearance of video images viewed after refraction through transparent surfaces of any shape (e.g. dew droplets, rippled water, bubbles, textured glass, beveled glass, jewel-like surfaces, ice cubes) with a high degree of realism. The index of refraction can be smoothly varied in real time. Properties of the refraction surface such as position, size, and orientation can be made in real time.

BEST MODE OF CARRYING OUT THE INVENTION

As discussed in connection with FIG. 10, a DVE processes each field of a frame of video. The "processing" is primarily a function of the addresses generated by the address generator.

Figure 1:
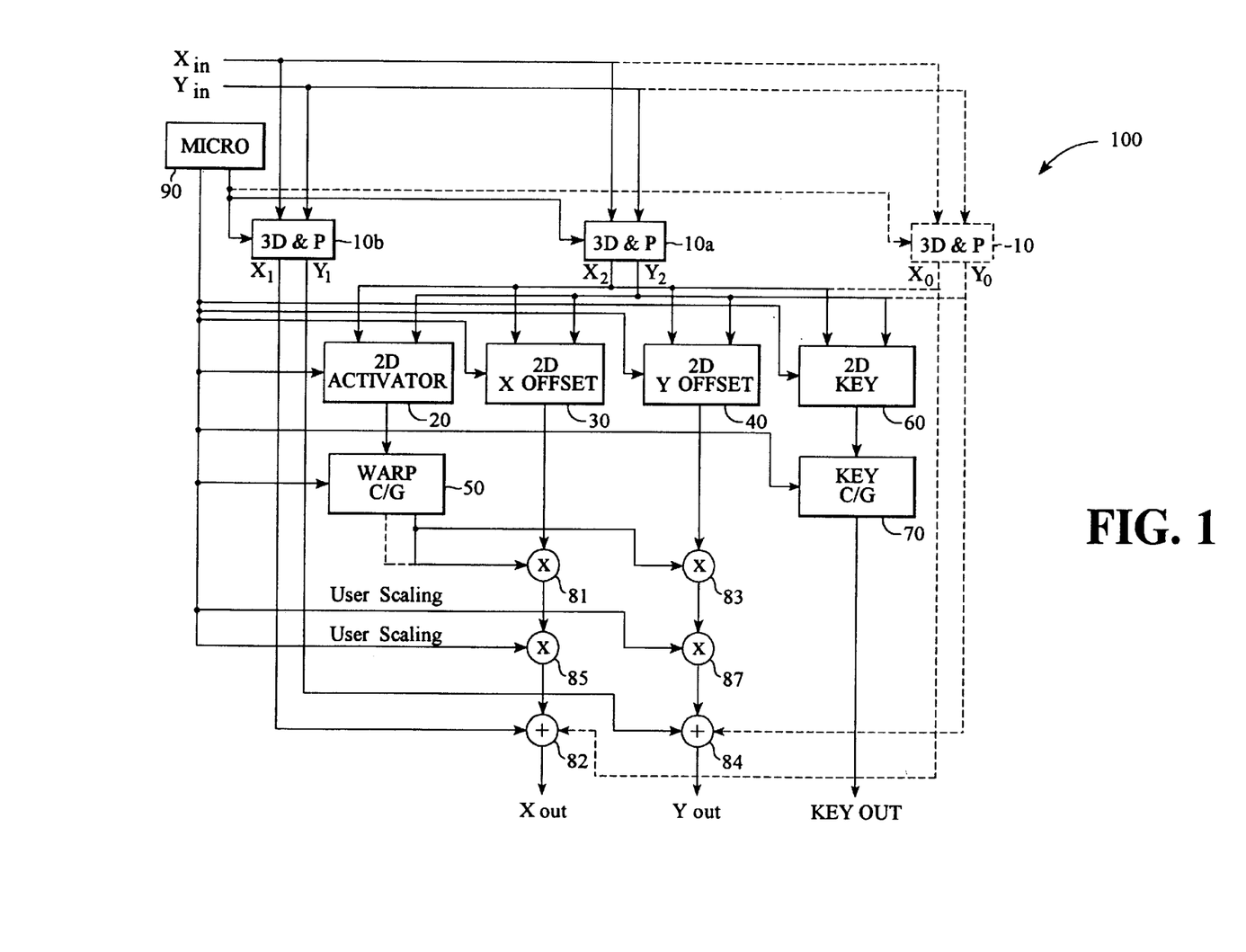
FIG. 1 illustrates the address generator in accordance with the present invention.

The address generator 100 shown in FIG. 1 receives raster-order addresses, consisting of coordinates $X_{in}$, $Y_{in}$ from the output raster generator shown in FIG. 10. The raster addresses are transformed by 3-D and perspective transformers 10a, 10b. These transformation matrices provide standard translation, rotation, scaling, and shearing effects (3-D transformation) followed by a projection of the transformed image. It is understood that the transformers 10a, 10b can be configured to provide any combination of these transformations, or none at all. Such transformations are well known in the art, and can be implemented in any of a number of ways using hardware and/or software.

The transformed coordinates $X_2$, $Y_2$ produced by transformer 10a feed into each of the 2-D warp and offset tables 20, 30, 40. Each of the 2-D tables 20, 30, 40 is indexed by the $X_2$, $Y_2$ coordinates to produce an output value. The output of the warp table 20 is a raw activation factor (activator) that feeds into a clip and gain unit 50, also referred to as a threshold activated unit. Clip and gain processing of the raw activator produces a scaled activator that feeds into multipliers (offset scalers) 81, 83. The clip and gain unit is further characterized in that the degree of scaling varies with each field of a frame of video being processed.

Figure 2:
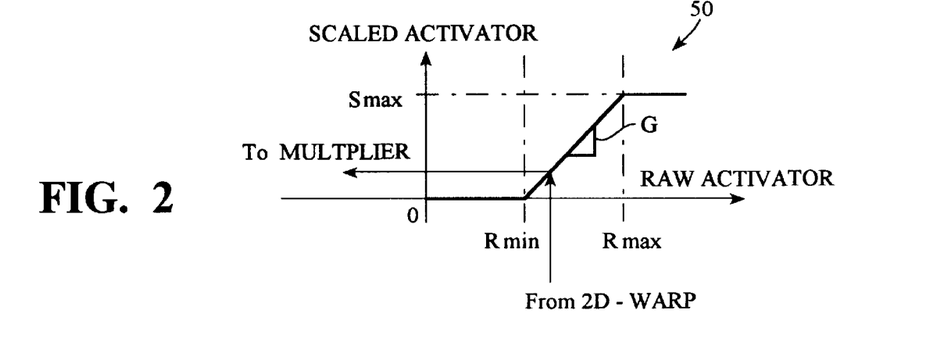
FIG. 2 shows a clip and gain unit.

FIG. 2 shows the transfer function of the clip and gain unit 50 that is presently used. The transfer function shown is a straight-line function having slope G defined for the domain $R_{min}$ to $R_{max}$, which maps raw activators to scaled activators. In practice, a negative shift value is added to the raw activator and the sum is multiplied by the slope G to produce a scaled activator. Where the sum falls below $R_{min}$, the scaled activator is set to $S_{min}$. Where the sum exceeds $R_{max}$, the scaled activator is set to $S_{max}$. Thus, a scaling range is defined by $R_{min}$ and $R_{max}$ between which the sum is scaled by the transfer function and outside of which the scaled activator is clamped between $S_{min}$ and $S_{max}$. Typically, $S_{min}$ is zero (0) and if an eight bit value is used, $S_{max}$ is 0xFF. As will be explained below, the clip and gain unit 50 to a large extent controls which portions of the output image go into motion, and when such motion is to occur.

Returning to FIG. 1, x-offset and y-offset tables 30, 40 produce x- and y-offset values respectively, that feed into the offset scalers 81, 83. The x- and y-offset values define what is called an offset vector, which specifies the amount and direction of displacement (or warping) of a pixel from its original location. In an alternate embodiment, the tables 30, 40 may consist of polar coordinates rather than rectangular coordinates, without departing from the intended function of the tables since polar coordinates also suffice to describe the desired displacement (or warping). The tables would contain angle and magnitude values, instead of X and Y coordinates.

Continuing, the outputs of the multipliers may be further scaled by multipliers 85, 87, which receive user specified scale coefficients. The outputs of multipliers 85, 87 are then fed into summers 82, 84. The summers receive coordinates $X_1$, $Y_2$ from transformer 10b. The coordinates $X_1$, $Y_1$ are summed with the scaled offsets produced by multipliers 85, 87. These resulting offset coordinates $X_{out}$, $Y_{out}$ are used as readout addresses to access pixels from the transformation RAM shown in FIG. 10. The readout addresses $X_{out}$, $Y_{out}$ are used to perform inverse mapping of the input pixels, thus producing a video output signal having a visual effect determined by the data loaded into the warp and offset tables 20, 30, 40, and driven by the clip and gain unit 50.

In an alternate embodiment of the invention, a single 3-D and perspective transformer 10 may be employed. This single-transformer configuration is indicated by the phantom lines shown in FIG. 1. The transformed raster-order address $X_0$, $Y_0$ is used both as the lookup address for the warp and offset tables 20, 30, 40, and as the basis for generating the readout addresses $X_{out}$, $Y_{out}$. For most effects, the single-transformer configuration is sufficient; the warp effect will track the 3-D and perspective transformation. Having two transformers (e.g. 10a, 10b) allows additional 3-D operations, such as placement within the same 3-D plane, causing for example a warp effect to pan through the overall 3-D perspective transformation.

As shown in FIG. 1, a 2-D key table 60 is provided to facilitate mixing foreground and background images. In applications where a background image replaces a foreground image, such as in a particle explosion effect, a key signal is required to blank out portions of the foreground which are to be occupied by the underlying background image. A clip and gain processor 70 is also provided for those effects which require that the background fades in as the corresponding areas of the foreground fade out, progressively cropping away regions of key table-defined shapes.

A microprocessing unit 90 provides overall control of the data flow through the address generator 100. The microprocessor loads the various tables, operates the clip and gain units 50, 70, operates in conjunction with the arithmetic units 81–87, and synchronizes all of these operations with the incoming video. In addition, the microprocessor permits a user to specify an additional scaling value which is input to multipliers 85, 87. As will become clear in the discussion which follows, this allows the user to control the degree of the effect.

Figure 3:
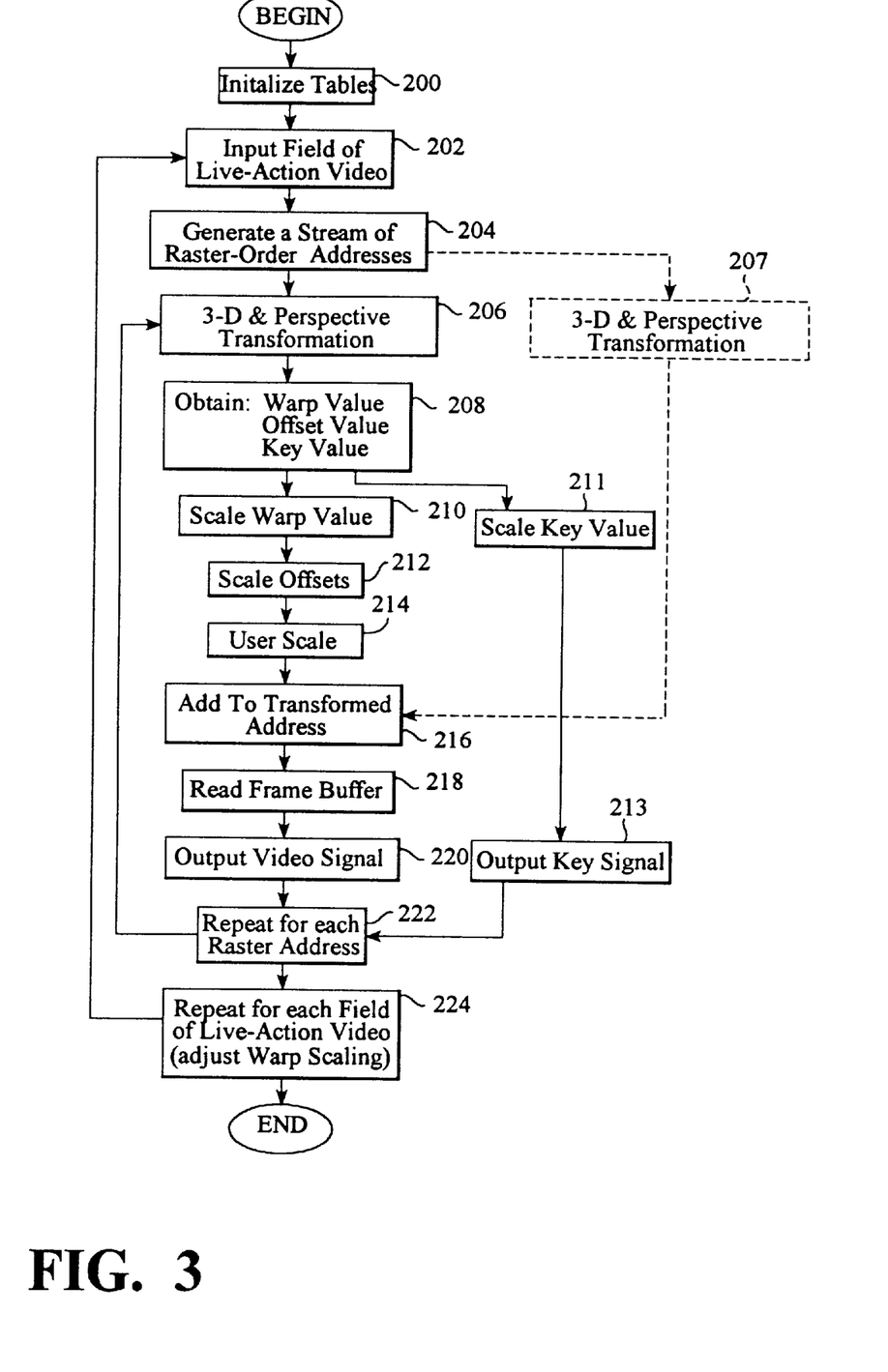
FIG. 3 is a flowchart of the processing which takes place in the address generator.

Turn now to FIG. 3 for an overview of the processing sequence which takes place in the address generator 100 shown in FIG. 1. In step 200, the microprocessor 90 loads the various tables with data: the warp table 20 receives warp values, the offset tables 30, 40 are loaded with offset values (either rectangular coordinates or polar coordinates).

Live-action video is input into one of two frame buffers, step 202. Each buffer contains one field of the current video frame. As shown in FIG. 10, each field is stored in its own transformation RAM; i.e. the odd-numbered scan lines (first field) of input video are stored in one transformation RAM, while the even-numbered scan lines (second field) are stored in the other transformation RAM.

Next, in step 204, a stream of raster-order addresses $X_{in}$, $Y_{in}$ are generated. These addresses are simply image (or pixel) addresses listed in scanline order; i.e. (0,0), (1,0), (2,0) . . . (0,1), (1,1), (2,1) and so on, where the uppermost and leftmost pixel is the origin (0,0). Each of the raster-order pixels then are transformed in step 206 by the 3-D and perspective transformer, producing a stream of lookup addresses.

In step 208, each of the lookup addresses is used to index the warp table, offset tables, and key tables 20, 30, 40, 60 to obtain values therefrom. The x-and y-coordinates of each address are used as indices into the 2-D tables. The raw warp activation factors (activators) are scaled by the clip and gain unit 50, in step 210, to produce scaled activators. In step 212, the scaled activators are used in turn to scale the x- and y-offset values obtained in step 208. Additional scaling of the offset values may be performed by a user, step 214.

The scaled offset values are then added, in step 216, to a base address to produce a stream of frame buffer readout addresses. In one embodiment, the base address is taken from transformation step 206, which are the warp table lookup addresses. Alternatively, the base addresses may be formed by taking the raster-order addresses produced in step 204 and transforming them through a second 3-D and perspective transformer as in step 207 shown in phantom.

Yet another alternative is not to perform any such transformations, ignoring step 206 (and step 207) altogether. In such a case, the resulting video effect would simply be constrained to run full-sized and centered on the screen; e.g. it would not be possible to scale the resulting video to half-screen size.

On the other hand, having a single transformation step 206 and ignoring transformation step 207 for the moment, allows the video effect to track the resulting transformation. A 3-D and perspective transformer maps video images onto any other rectangular region of any 3-D plane, and then produces a perspective image by a perspective projection of the 3-D transformed image. With one 3-D and perspective transformation, namely step 206, to serve both as the warp table lookup address in step 208 and the base address in step 216, the video effect effectively operates within the rectangular region of the 3-D plane.

Having a second transformation, namely step 207, to provide the base address for step 216, allows the video effect to pan through the full-size and centered video image; e.g. soap bubbles (a refraction effect) can be made to fly through the video image. In addition, the video effect can be made to pan through the rectangular region of the 3-D plane defined in the transformation of step 207. This is accomplished by using a transformer to generate lookup addresses in step 206 that is only slightly different from the transformer for generating base addresses in step 207.

Continuing, the readout addresses are used to read pixels from the appropriate frame buffer, step 218, to construct the video signal, step 220. This process is repeated for each field of a frame of live-action video, steps 222, 224. Additionally in step 224, the clip and gain unit 50 is adjusted so that the amount of scaling of the raw warp activators is different during the next field of the video frame.

Returning to step 208, recall that the key table is indexed by the transformed raster-order addresses. This produces a stream of key values, which is then scaled in step 211 by another clip and gain unit 70. The resulting stream of scaled key values is used to construct the key signal, step 213.

Following are some examples which illustrate the processing of the 2-D tables 20, 30, 40 and the clip and gain unit 50. In the simplest case, there is no 3-D and perspective transformation of the raster-order addresses $X_{in}$, $Y_{in}$ and the offset tables 30, 40 contain zeroes, so that inverse mapping of the frame buffer simply results in the direct mapping of the input image to an output signal. In the case where there is a 3-D and perspective transformer (and zero offsets), the effect is simply a transformation of the input image transformed in accordance with the transformer.

Figure 4A:
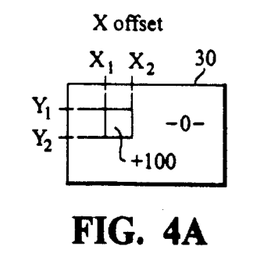
FIGS. 4A–4D illustrate the operation of the 2-D offset tables.
Figure 4B:
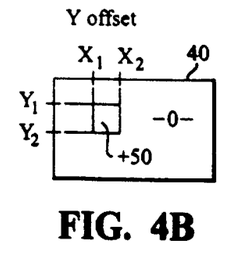
Figure 4C:
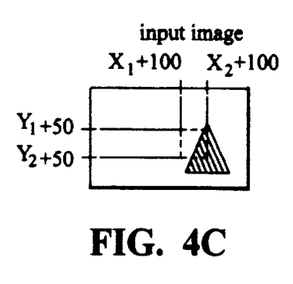
Figure 4D:
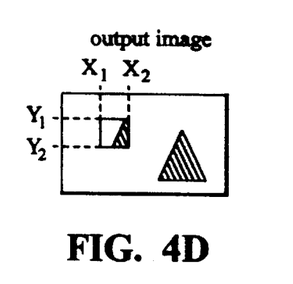

Consider the case of non-zero x- and y-offset values, where both the output of the clip and gain unit 50 and the user specified scaling are unity. Assuming that the raster-order addresses are not subjected to 3-D and perspective transformations, then the x- and y-coordinates of the raster-order addresses are simply offset by their corresponding values in the offset tables 30, 40. FIGS. 4A and 4B show x- and y-offset tables having entries for a small group of pixel addresses which define a square region bounded by vertices $(x_1, y_1)$ and $(x_2, Y_2)$. Suppose each offset value in the square region of the x-offset table is +100 and zero elsewhere, and in the square region of the y-offset table is +50 and zero elsewhere. Suppose further that the input image frame buffer consists of a triangle as shown in FIG. 4C. Recall that each raster-order address is offset by its corresponding values in the offset tables to form the readout addresses. FIG. 4C shows the portion of the frame buffer accessed by the readout addresses. A resampling of the frame buffer by inverse mapping results in the effect shown in FIG. 4D.

Figure 5A:
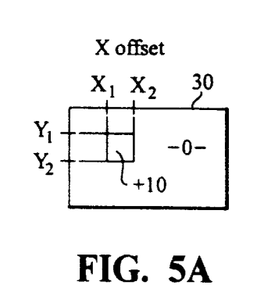
FIGS. 5A–5E illustrate the operation of the warp table and the clip and gain unit.
Figure 5B:
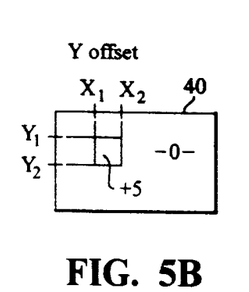
Figure 5C:
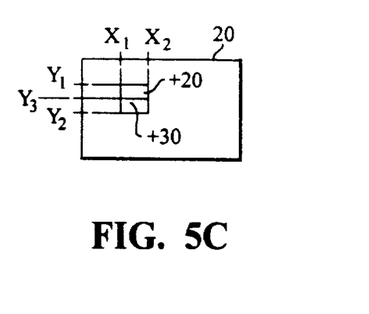

Consider next the case where the warp table 20 and the clip and gain unit 50 output non-unity values, assuming for the moment that user specified scaling is unity (i.e. the input to multipliers 85, 87 is '1'). The x- and y-offset tables 30, 40 shown in FIGS. 5A and 5B have offset values +10 and +5, respectively. FIG. 5C shows a warp table 20, having raw warp value entries for the following sets of pixel addresses: the region bounded by $(x_1, Y_1)$ and $(x_2, Y_3)$ contains a warp value of 20; the region bounded by $(x_1, y_3)$ and $(x_2, y_2)$ contains a warp value of 30.

Figure 5D:
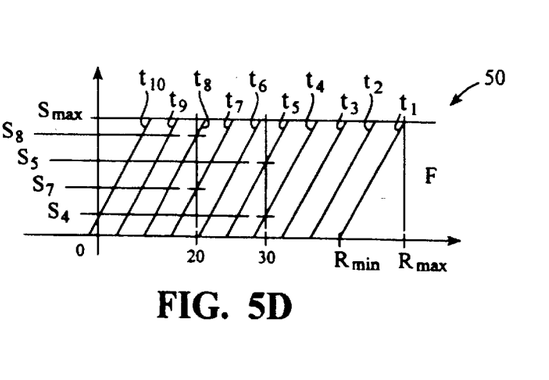

FIG. 5D graphically depicts the behavior of the clip and unit 50 over a period of time $t_1-t_{10}$. As in FIG. 2, the transfer function shown in FIG. 5D defines the clip and gain unit as a straight-line function F, which is truncated at thresholds $R_{min}$ and $R_{max}$. At each time interval $t_1-t_{10}$, the straight-line function is shifted by a certain amount, accomplished by adjusting $R_{min}$ and $R_{max}$. Recall that the clip and gain unit serves to map the raw activator coming out of the warp table 20 to produce a scaled activator. Thus, referring to FIG. 5D, it can be seen that at time period $t_1$, raw activator values 30 and 20 are mapped to zero (fully inactive), since both are less than $R_{min}$ at this time; this is also true for time periods $t_2$ and $t_3$ when the transfer function F has shifted to the left somewhat. At time period $t_4$, raw activator value 30 becomes "activated" as it is mapped to scaled value $S_4$, while raw value 20 is still mapped to 0. At time $t_5$, raw value 30 is now mapped to scaled value $S_5$, and again raw value 20 is mapped to 0. At time period $t_6$, raw value 30 is "fully activated" since it exceeds $R_{max}$ and is thus mapped to a scale value of $S_{max}$. At time $t_7$, raw value 20 becomes "activated" and is mapped to scale value $S_7$ and so forth, until raw activator 20 becomes "fully activated" at time $t_9$ and is mapped to $S_{max}$. Although the direction of shift shown in FIG. 5D is right-to-left, clearly it is possible to run the effect by shifting the transfer function left-to-right. Moreover, the adjustment to the transfer function can be made to cycle in both directions, resulting in a pulsating visual effect.

As explained above, the adjustment which occurs in the clip and gain unit occurs once for each period of time. In the preferred embodiment of the invention, these time periods correspond with each field of a video frame that is read into an image buffer. Because of the interlacing, each frame of video can be treated as two fields, one field consisting of the odd-numbered lines and the other field consisting of the even-numbered lines. Pipeline processing is therefore possible by alternating between the first and second fields for each period, resulting in greater image processing throughput of the video. Nevertheless, it is not inconsistent with the scope and spirit of the invention to provide adjustments to the clip and gain unit at a rate greater than or less than once per field.

Figure 5E:
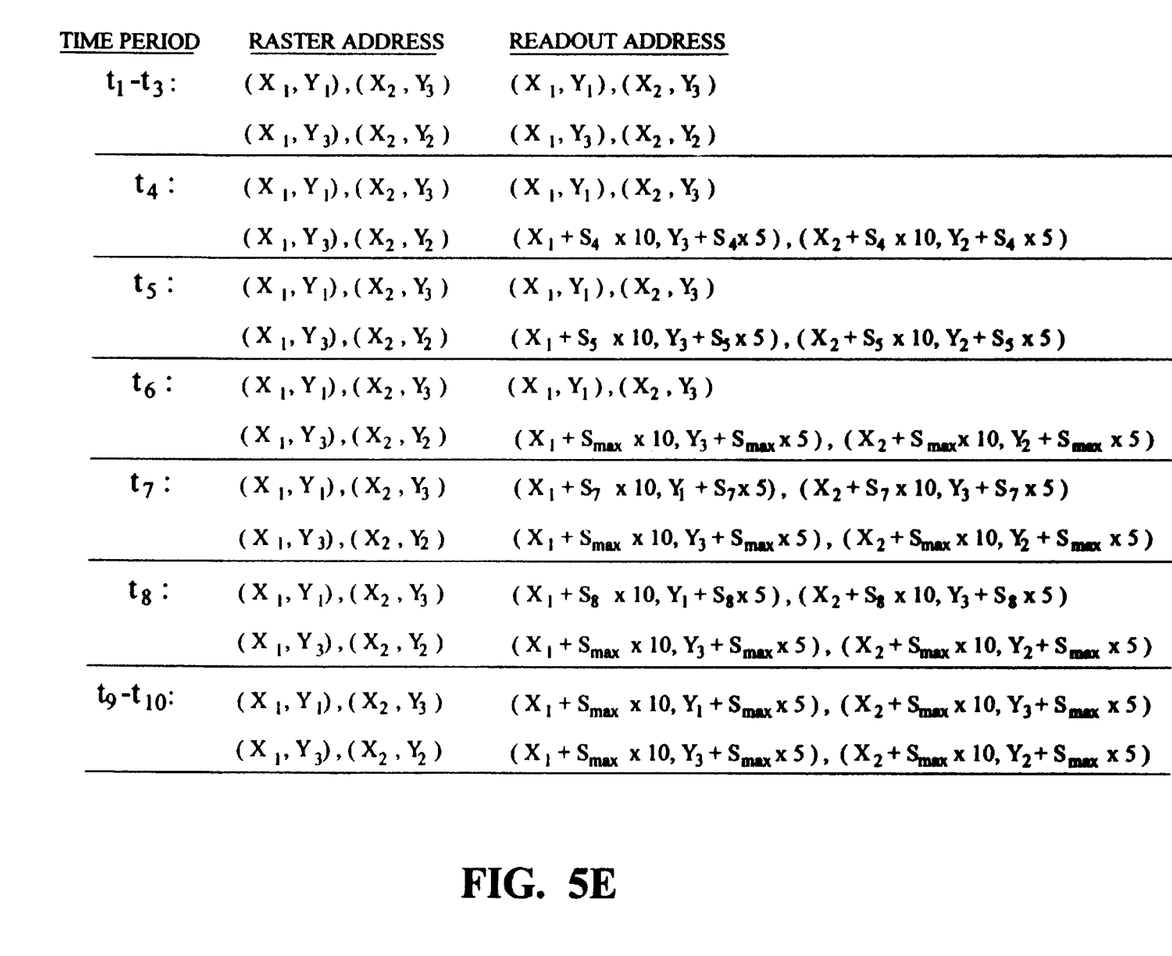

The table in FIG. 5E shows the effect on the readout addresses as raw activator values produced by the warp table 20 become activated by the clip and gain unit 50 over the time period $t_1-t_{10}$. For time periods $t_1-t_3$, the readout addresses are the same as the raster addresses, since raw activator values 20 and 30 both map to scaled values of zero; no video effect occurs during these periods of time. At time $t_4$, the region bounded by $(X_1, y_3), (x_2, Y_2)$ is set into motion, since the corresponding scaled activator for the region is no longer zero (i.e. $S_4$), so that the readout address is offset as shown in the figure. The region continues its motion during time periods $t_5$ and $t_6$. At $t_6$, motion of the region ceases since the corresponding scaled activator is at maximum value $S_{max}$ so that the readout addresses are at maximum offset. Note that for time periods $t_1-t_6$, the region bounded by $(x_1, Y_1), (x_2, Y3)$ remains stationary, since the corresponding scaled activator is zero. However, at times $t_7-t_9$ the region is set into motion, until at $t_9$ its corresponding scaled activator reaches maximum.

Referring back to FIG. 5D, observe that as the straight-line function of the clip and gain unit is shifted, the threshold values $R_{min}$ and $R_{max}$ shift as well. By selecting groups of output coordinates and associating different raw activation factors in the warp table 20 corresponding to such groups of coordinates, different portions of the output image will be set into motion as the thresholds shift. For this reason, clip and gain processing may also be referred to as threshold activated processing.

The number of such groups simultaneously set into motion (time staggering of groups) is controlled by the gain (slope) of the straight-line function. For example, an infinite gain (slope) will activate each group one at a time as the transfer function shifts. On the other hand, a low gain value will activate one or more groups, depending on how "flat" the straight-line function is. The gain also controls the amount of displacement of each group per time period. Thus with a high gain, the elements are displaced by a large distance with each time period, causing a "lurching" effect as the elements of the image appear to jump from one position to the next while the effect runs. Conversely, a lower gain value will result in a smoother movement, since the groups will be displaced by smaller distances with, each time period.

In the preferred embodiment of the invention, the transfer function used in the clip and gain unit is shown in FIG. 5D as being a straight-line function. While this simplifies the implementation of the clip and gain unit 50, it is clear that any arbitrary transfer function may be used instead without departing from the functionality provided by clip and gain processing, limited only by practical considerations such as available processing power. The following describes the family of transfer functions contemplated for use in the clip and gain unit:

$$S = \begin{cases} S_{min} & \text{for } R \leq (R_{min} + \Delta R) \\ F(R - (R_{min} + \Delta R)) & \text{for } (R_{min} + \Delta R) < R < (R_{max} + \Delta R) \\ S_{max} & \text{for } R \geq (R_{max} + \Delta R) \end{cases}$$

where

F is an arbitrary function defining scaled activation factors as a function of raw activation factors, S is the scaled activation factor, R is the raw activation factor, $R_{min}$ and $R_{max}$ are minimum and maximum threshold values, $\Delta R$ shifts the function F, and $S_{min}$ is typically zero.

Figure 6A:
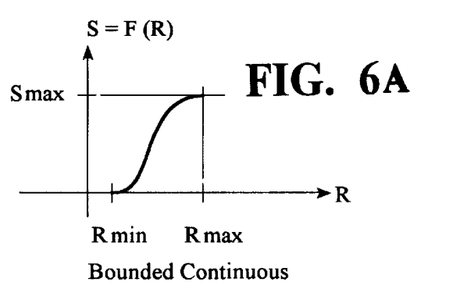
FIGS. 6A–6E shows various mapping functions for clip and gain processing used in the present invention.
Figure 6B:
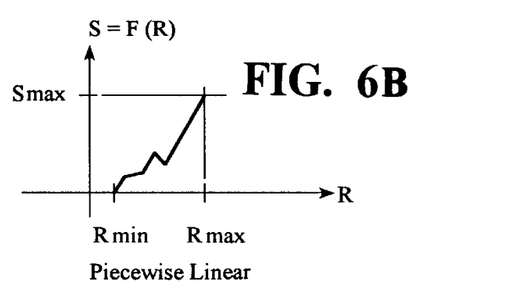
Figure 6C:
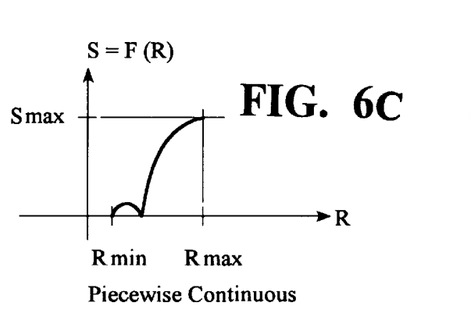
Figure 6D:
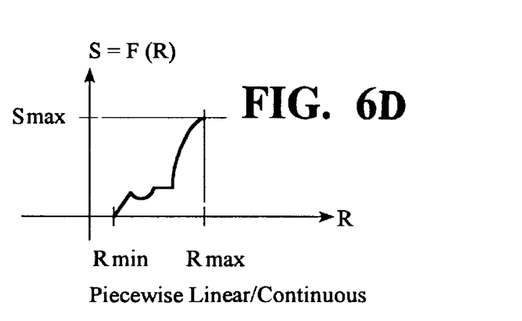
Figure 6E:
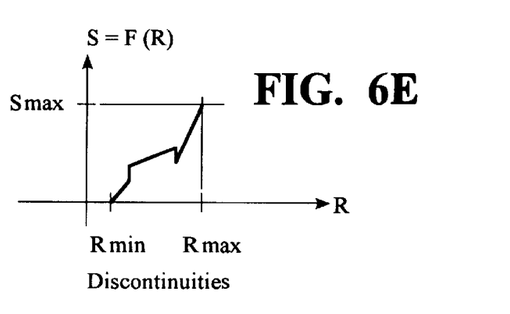

FIGS. 6A–6E show various functions that can serve as the transfer function of the clip and gain unit. The function F may be a continuous function (FIG. 6A) defined for the domain $(R_{min}, R_{max})$. The function may be a piecewise linear function (FIG. 6B), a piecewise continuous function (FIG. 6C) or some combination of linear and continuous segments (FIG. 6D). The function may have discontinuities (FIG. 6E). As noted above, any arbitrary function is contemplated; the limitations in the technology being the determinative factor as to the specific function implemented for the clip and gain unit.

In the preferred embodiment of the invention, the scaled activator produced by the clip and gain unit 50 feeds into both the x-offset scaler 81 and the y-offset scaler 83. Since the x- and y-offsets together define a vector, scaling both offsets by the same factor has the effect of changing the vector magnitude. In an alternate embodiment of the invention, separate scaled activators are provided for each of the x- and y-offsets. This would allow the x and y coordinates of the readout address to vary independently of one another, allowing both the magnitude and the angle of the vector to change with time. A second warp table may be provided, or a second transfer function in the clip and gain unit 50 may be used to produce two different scaled activation factors, each feeding into one of the offset scalers 81, 83.

The clip and gain unit may be implemented purely in software, employing lookup table techniques and/or dedicated math co-processors. At the other end of the spectrum, custom ASICs may be used to provide a pure hardware solution. Analog computing methods using A/D conversion may be used. The implementation details of the clip and gain unit are deemed to be well within the scope of understanding of an artisan of ordinary skill. The specific implementation selected being solely a function of marketing requirements, available technology, development costs, manufacturing costs, and so on.

This is generally true for the invention as a whole. Implementation of the elements and the processing comprising the invention discussed herein is a matter requiring ordinary skill in the computer and computer imaging arts, and does not require the use of programming or hardware techniques beyond what currently exists. As the technology improves, the present invention may be practiced with such improved technology without departing from the spirit and scope of the invention.

Figure 7:
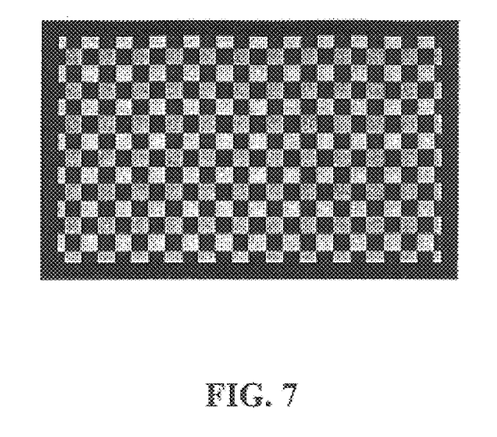
FIG. 7 shows a test image to be used in the effects illustrated in FIGS. 8 and 9.
Figure 8A:
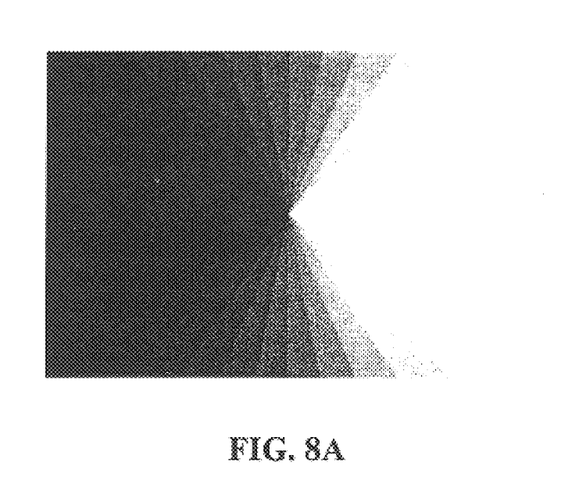
FIGS. 8A–8C illustrate a time sequence for a burst effect.
Figure 8B:
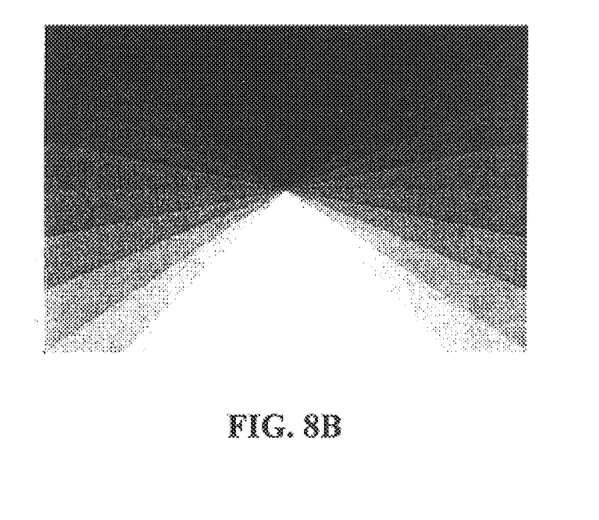
Figure 8C:
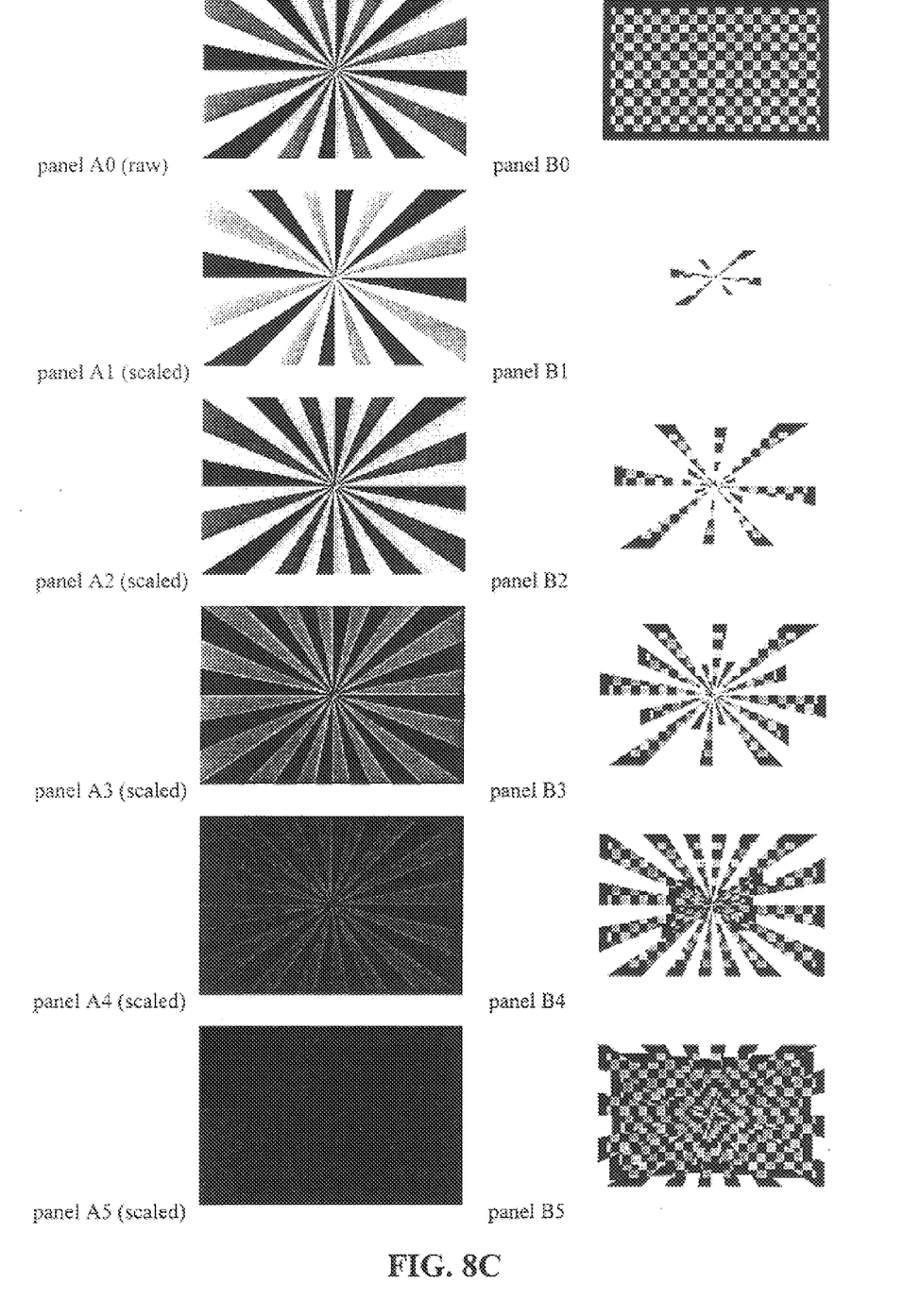
Figure 9:
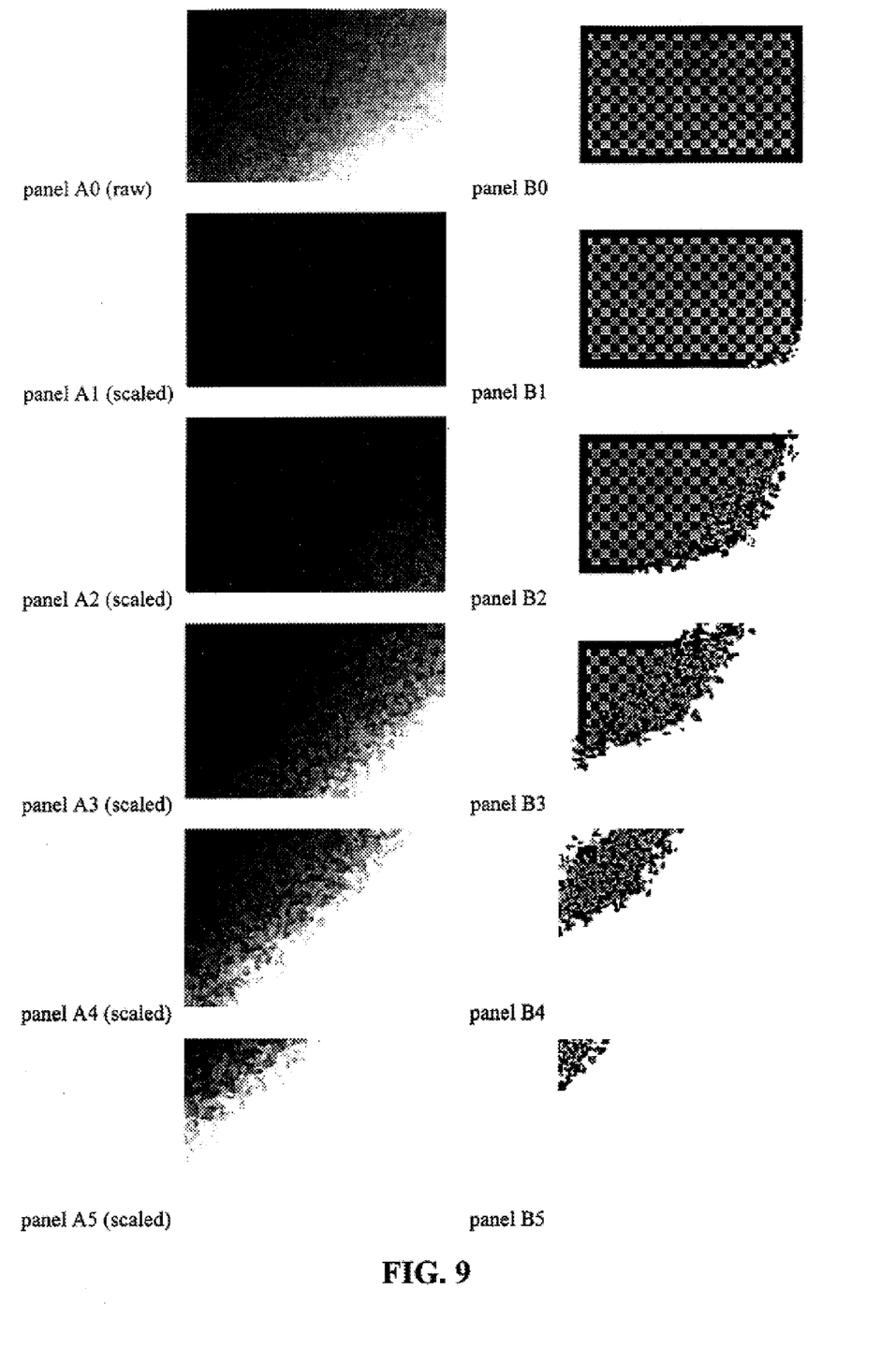
FIG. 9 is a time sequence for a particle effect.

Examples of the tables and the effects produced in accordance with the invention are shown in FIGS. 7–9. FIG. 7 is a test image which will be used in the following discussion. FIGS. 8A–8C and 9 are time sequences of the output image showing the transformations made to the test image as the effect is run.

The time sequence of FIG. 8C illustrates an example of a burst effect. The x- and y-offset tables 30, 40 (FIG. 1) used for this sequence are represented by the gray scale images shown in FIGS. 8A and 8B, respectively. The offset values in these tables are visually represented by corresponding gray values comprising the images.

Panel A0 of FIG. 8C is a gray scale image representing the raw activation factors stored in the warp table 20 (FIG. 1) for this particular effect. In this case, the warp table consists of three values arranged in an alternating radial pattern. Panels A1–A5 represent the scaled activation factors generated by the clip and gain unit 50 (FIG. 1) at each period of time in the sequence. The transfer function used for this effect is similar to the examples shown in FIGS. 2 and 5C, namely a straight-line function having threshold values. The changing gray values (i.e. scaled warp values) from one panel to the next are the result of adjusting the threshold values in the clip and gain unit as explained above in connection with FIG. 5D. As the minimum and maximum thresholds shift with each time period, the scaling of the raw warp values will change. In both FIGS. 8A–8C and 9, the darker gray values represent low activation values; i.e. the offset value is low, resulting in a low warping of the input image. The lighter gray values represent high activation values; i.e. the offset value is high. Observe that in FIGS. 8A–8C the adjustment to the transfer function of the clip and gain unit is left-to-right, while in FIG. 9 the adjustment is right-to-left.

Panel B0 of FIG. 8C is the test image at the beginning of the burst sequence. The scaled warp values in panels A1–A5 are combined (e.g. multiplied) with the corresponding values in the offset tables of FIGS. 8A and 8B. The scaled offsets are used to offset the corresponding output image addresses, which are then used to read the input image. See FIG. 5E and the accompanying text. The output image shown in the subsequent panels B1–B5 illustrate the effect as the sequence runs. In panel A1, most of the scaled warp factors are high, as indicated by the light-colored radial bands, thus producing high offset values. The output, therefore, consists mostly of pixels obtained beyond the edge of the test image which in this case are displayed as white. As the scaled warp values become increasingly inactivated, the offsets decrease so that more of the output consists of the interior portions of the test image as shown in panels B1–B3. Finally in panels B4 and B5, most of the scaled warp factors are inactivated so that there is almost a one-to-one mapping from the input to the output.

The sequence shown in FIG. 9 illustrates a particle effect. For this particular sequence, the values in each of the x-offset and y-offset tables are constant throughout the image. A grayscale image of each of these tables (not shown) would appear as a field of a single shade of gray. Panel A0 in FIG. 9 is the raw warp table for this effect. panel B0 is the test image at the beginning of the sequence.

The transfer function for this effect initially maps almost all of the raw warp values to zero, as indicated by the large field of black in panel A1. The resulting output, therefore, consists of a one-to-one mapping of the input test image. As the effect runs, the transfer function is shifted such that the scaled warp values (A1–A5) become increasingly activated. This causes input pixels toward the outer periphery and beyond to map to the output, see panels B2 and following. This progression continues until all of the scaled warp factors are activated, at which point the image disappears.

The examples of FIGS. 8A–8C and 9 show only a test image. In a typical use of the DVE, such a test image may serve either as the foreground image or the background image displayed in conjunction with another image. For example, in the burst effect of FIG. 8C, the test image may be the background image which gradually appears in place of a foreground image. Similarly with the particle effect of FIG. 9, the test image may be the foreground image which is gradually wafted away to reveal an underlying background image.

We claim:

1. A video effects device for producing live-action video, comprising:

input means for capturing a frame of live-action video and for storing said frame in a frame buffer as a set of pixels;

means for generating image addresses, each having an x-coordinate and a y-coordinate;

a vector offset table addressed by a first index and by a second index, including first means for receiving the x-coordinate and y-coordinate of a first image address respectively as the first index and second index;

means for mapping said first image address to a raw activation factor;

means for reducing or increasing a raw activation factor to produce an adjusted activation factor, including means for varying the amount of reduction or increase with time;

computation means for multiplying an adjusted activation factor with a vector offset to produce an activated vector offset and for adding said activated vector offset to a second image address to produce a frame buffer read address; and means for outputting pixels, coupled to said computation means and to said frame buffer to generate a transformed video signal.

2. The video effects device of claim 1 wherein said input means includes a second frame buffer wherein first and second fields of a frame of video are stored in said frame buffers, and wherein said means for varying is synchronized with each said field.

3. The video effects device of claim 1 wherein said means for varying is synchronized with each frame of live-action video.

4. The video effects device of claim 1 wherein said means for mapping includes a warp activation table addressed by said first index and by said second index.

5. The video effects device of claim 1 wherein said means for reducing or increasing includes:
 a clipper unit for outputting a first value or a second value if a raw activation factor is less than a minimum threshold or exceeds a maximum threshold; and
 a gain unit for multiplying a raw activation factor by a gain value if said raw activation factor falls between said minimum and maximum thresholds.

6. The video effects device of claim 5 wherein said first value is equal to zero.

7. The video effects device of claim 5 wherein said means for varying includes changing said minimum and said maximum thresholds.

8. The video effects device of claim 5 wherein said means for varying includes changing said gain value.

9. The video effects device of claim 1 wherein said means for reducing or increasing includes a combination of piecewise linear functions.

10. The video effects device of claim 1 wherein said means for reducing or increasing includes means for computing said adjusted activation factor as a continuous function of said raw activation factor.

11. The video effects device of claim 1 further including a video mixing means for combining a video signal and said transformed video signal into a single output video signal.

12. The video effects device of claim 11 further including a key table indexed by the x-coordinates and y-coordinates of image addresses, thereby producing a key signal; said video mixing means responsive to said key signal for blending together said video signal and said transformed video signal.

13. The video effects device of claim 1 wherein said means for outputting includes means for reading out pixels from said frame buffer addressed by frame buffer read address and means for generating a video signal from such pixels.

14. The video effects device of claim 1 wherein said means for generating image addresses includes means for producing raster-order addresses and means for transforming said raster-order addresses through a 3-D transformer and a perspective transformer.

15. The video effects device of claim 14 wherein said 3-D transformer is capable of producing at least one of scaling, rotation, translation, and shear effects.

16. The video effects device of claim 1 wherein said first and second image addresses are the same address.

17. A method for producing live-action video effects, comprising the steps of:
 defining a video effect, including initializing a vector offset table and an activation table, each table indexed by a first index and a second index;
 inputting a first video signal and storing said video signal in a frame buffer as a plurality of pixels;
 generating a stream of pixel addresses, each having an x-coordinate and a y-coordinate;
 generating a stream of vector offsets from said vector offset table, including indexing said vector offset table by the x-coordinates and the y-coordinates of said stream of pixel addresses;
 generating a stream of raw activation values, including indexing said activation table by the x-coordinates and the y-coordinates of said stream of pixel addresses;
 generating a stream of adjusted activation values by performing a computation of said stream of raw activation values with an adjusting function;
 generating a stream of scaled offsets, including scaling said stream of vector offsets by corresponding values in said stream of adjusted activation values;
 varying said adjusting function; and
 generating a stream of output pixels, including adding said stream of scaled offsets to a stream of pixel addresses and reading out said frame buffer with addresses produced thereby.

18. The method of claim 17 wherein said step of initializing a vector offset table includes initializing an x-offset table and a y-offset table, an x-offset and a y-offset together defining a vector offset.

19. The method of claim 17 wherein said step of generating a stream of pixel addresses includes applying a combination of scaling, translation, rotation, shear, and projection transformations on a set of raster-order addresses.

20. The method of claim 17 wherein said adjusting function includes a minimum threshold and a maximum threshold, said step of generating a stream of adjusted activation values includes (i) outputting a first activation value, if a raw activation value is less than said minimum threshold, (ii) outputting a second activation value, if a raw activation value is greater than said maximum threshold; and (iii) outputting a value between said first activation value and said second activation value otherwise.

21. The method of claim 20 wherein said first activation value is equal to zero.

22. The method of claim 20 wherein said step of varying said adjusting function includes changing both said minimum and maximum thresholds.

23. The method of claim 17 further wherein said step of storing said video signal includes storing first and second fields of each frame of said video signal, and said step of varying said adjusting function is performed at a rate of once per field.

24. The method of claim 17 wherein:
 said step of generating a stream of adjusted activation values includes computing the following:

$$S = \begin{cases} S_{\min} & \text{for } R \le (R_{\min} + \Delta R) \\ F(R - (R_{\min} + \Delta R)) & \text{for } (R_{\min} + \Delta R) < R < (R_{\max} + \Delta R) \\ S_{\max} & \text{for } R \ge (R_{\max} + \Delta R) \end{cases}$$

where
 F is said adjusting function,
 S is an adjusted activation value,
 R is a raw activation value; and
 said step of varying said adjusting function includes incrementing or decrementing $\Delta R$.

25. The method of claim 24 wherein said adjusting function F is a straight-line function having a slope G.

26. A video effects device comprising a video input buffer for storing an input image as a plurality of pixels, an address generator for producing pixel read out addresses, a video output means for producing an output video signal based on said pixel readout addresses, said address generator comprising:

means for generating an image address, said image address having an x-coordinate and a y-coordinate;

first means for mapping said image address to an offset vector;

second means for mapping said image address to an activation factor;

means for scaling said activation factor to produce a scaled activation factor, the degree of scaling varying with time;

means for combining said scaled activation factor and said offset vector to produce a scaled offset vector; and means for adding said scaled offset vector to said image address to produce a pixel readout address;

whereby said output video signal is produced by accessing pixels from said video input buffer based on pixel readout addresses.

27. The video effects device of claim 26 wherein the degree of scaling by said means for scaling varies with each field of a frame of video.

28. The video effects device of claim 26 wherein the degree of scaling by said means for scaling varies with each frame of video.

29. The video effects device of claim 26 wherein said offset vector comprises an x-offset and a y-offset, said means for combining includes means for multiplying said scaled activation factor with each of said x-offset and said y-offset.

30. The video effects device of claim 26 wherein said means for scaling includes:

clipping means for setting said scaled activation factor equal to a first activation value or a second activation value if said activation factor falls outside of a scaling range defined by a maximum threshold and a minimum threshold;

gain means for computing said scaled activation factor as a function of said activation factor if said activation factor falls within said scaling range; and range adjust means for adjusting said minimum and maximum thresholds of said scaling range.

31. The video effects device of claim 30 wherein said gain means includes means for multiplying said activation factor with a gain value.

32. The video effects device of claim 31 wherein said gain value varies with time.

33. The video effects device of claim 30 wherein said function in said gain means is one of a piecewise linear function, a piecewise continuous function, or a combination thereof.

34. The video effects device of claim 26 wherein said means for generating includes a generator of raster-order addresses and a 3-D and perspective effects transformer coupled to receive said raster-order addresses to produce image addresses.

35. The video effects device of claim 26 further including means for inputting a user-specified multiplication factor and means for multiplying said user-specified multiplication factor with said scaled activation factor.

36. The video effects device of claim 26 wherein said first and second means for mapping each includes a lookup table indexed by the x- and y-coordinates of said image address.

37. The video effects device of claim 26 wherein said first and second means for mapping each includes a lookup table indexed by a scalar value and a means for computing said scalar value based on the x- and y-coordinates of said image address.

38. A method for manipulating live-action video to produce video effects in real-time, comprising the steps of:

(a) inputting and storing live-action video in a memory store as a set of input pixels, each input pixel being addressed by an x-coordinate and a y-coordinate;

(b) providing a plurality of offset vectors;

(c) providing a plurality of warp activation values;

(d) providing a mapping relation for mapping a first warp activation factor to produce a second warp activation factor;

(e) selecting an offset vector from among said plurality of offset vectors;

(f) selecting a warp activation value from among said plurality of warp activation values;

(g) mapping a selected warp activation value to produce a mapped warp activation value;

(h) multiplying said mapped warp activation value with a selected offset vector to form a scaled offset vector;

(i) constructing a video signal, including adding said scaled offset vector to a raster-order address to produce a readout address and accessing a pixel from said memory store addressed by said readout address;

(j) altering said mapping relation; and (k) repeating said steps (e) through (j).

39. The method of claim 38 wherein said step of altering said mapping relation is performed at a rate of once for each field of a video frame.

40. The method of claim 38 wherein said step of altering said mapping relation is performed at a rate of once for each video frame.

41. The method of claim 38 wherein said step of providing offset vectors includes initializing an x-offset table and a y-offset table, whereby each x-offset has a corresponding y-offset which together define an offset vector; said step of selecting an offset vector includes selecting an x-offset and a y-offset; and said step of multiplying includes multiplying said mapped warp activation value with a selected x-offset and a selected y-offset.

42. The method of claim 41 wherein said x-offset and y-offset tables are arranged in row and column order; and said step of selecting an offset vector further includes selecting a pixel coordinate and indexing into the row and column of each of said x-offset and y-offset tables to produce said selected x-offset and said selected y-offset.

43. The method of claim 42 wherein said step of providing a mapping relation includes providing an x-mapping relation and a y-mapping relation, said step of mapping produces an x-mapped warp value and a y-mapped warp value, and said step of multiplying includes multiplying selected x-offset and selected y-offset values respectively by said x-mapped warp value and y-mapped warp value.

44. The method of claim 38 wherein:

said step of providing a mapping relation includes selecting a minimum warp activation threshold and a maximum warp activation threshold;

said step of mapping includes the substeps of (i) setting said mapped warp activation value equal to a min value, if said selected warp activation value is less than said minimum warp activation threshold; (ii) setting said mapped warp activation value equal to a max value, if said selected warp activation value is greater than said maximum warp activation threshold; and (iii)

setting said mapped warp activation value to a value between said min value and said max value, otherwise; and said step of altering said mapping relation includes adjusting said minimum warp activation value and said maximum warp activation value.

45. The method of claim 44 wherein said substep (iii) includes defining mapped warp activation values as a function, F, of selected warp activation values.

46. The method of claim 45 wherein said function F is a continuous function.

47. The method of claim 45 wherein said function F is a straight line function.

48. The method of claim 45 wherein said function F is a piecewise linear function, a piecewise continuous function, or a combination thereof.

49. A video effects device for producing live-action video effects on a video display, comprising:

video input means for obtaining a live-action video image;

a video memory to store said live-action video image as a plurality of input pixels, said video memory being addressed by an x-coordinate and a y-coordinate;

means for generating pixel coordinates;

an x-offset table having offset values which are referenced by a first index and a second index;

a y-offset table having offset values which are referenced by said first index and said second index;

means for selecting an x-offset and a y-offset respectively from said x-offset table and said y-offset table, including means for receiving, as said first index, the x-coordinate of a first generated pixel coordinate and for receiving, as said second index, the y-coordinate of said first generated pixel coordinate;

calculation means for computing a sum of a selected x-offset value and the x-coordinate of a second generated pixel coordinate and for computing a sum of a selected y-offset value and the y-coordinate of said second generated pixel coordinate, thereby producing a readout pixel coordinate; and a video signal generator, coupled to said calculation means, for reading out said video memory to produce a video signal.

50. The video effects device of claim 49 wherein said means for selecting further includes scaling means for scaling each of a selected x-offset and a selected y-offset.

51. The video effects device of claim 49 wherein said means for generating pixel coordinates includes means for generating raster-order addresses and means for transforming said raster order addresses to produce a combination of translation, rotation, and perspective-projection transforms.

52. The video effects device of claim 49 wherein said means for generating includes a first translation, rotation, and perspective transformer and a second translation, rotation, and perspective transformer, and wherein said first generated pixel coordinate is produced by said first transformer and said second generated pixel coordinate is produced by said second transformer.

53. The video effects device of claim 49 wherein said first generated pixel coordinate and said second generated pixel coordinate are the same coordinate.

54. The video effects device of claim 49 further including a second video input means and a video mixing means for combining an image produced by said video output means with an image obtained by said second video input means.

55. A method of producing live-action video effects in real time, comprising the steps of:

selecting a visual effect;

initializing a vector table to contain a plurality of transform vectors for producing a selected visual effect, said vector table organized as rows and columns, each transform vector comprising an x-offset and a y-offset;

following said steps of selecting and initializing, inputting a video signal and storing said video signal as a frame of live-action video in a memory store as a set of pixels, each pixel being addressed by an x-coordinate and a y-coordinate;

producing a stream of pixel addresses;

accessing transform vectors from locations in said vector table addressed by said stream of pixel addresses to produce a stream of transform vectors;

combining said pixel addresses with accessed transform vectors to produce readout addresses; and reading out pixels from locations in said memory store addressed by said readout addresses and outputting such pixels in a video output signal.

56. The method of claim 55 further including selecting a second visual effect and initializing said vector table to contain a second plurality of transform vectors, thereby producing second live-action video effects.

57. The method of claim 55 wherein said step of producing a stream of pixel addresses includes producing raster-order addresses and taking a 3-D perspective transformation of said raster-order addresses.

58. The method of claim 55 wherein said step of initializing said vector table includes initializing a table of x-offsets with offset values and a table of y-offsets with offset values, each table organized in rows and columns, each vector consisting of an x-coordinate offset paired with a corresponding y-coordinate offset.

59. The method of claim 55 wherein said step of combining further includes multiplying each transform vector with a scalar value.

60. The method of claim 59 wherein said step of combining further includes changing said scalar value over time.

61. The method of claim 59 wherein said step of combining further includes changing said scalar value with each successive field of a frame of live-action video.

62. The method of claim 55 further including combining said video output signal with a second video signal.

\* \* \* \* \*